F. H. HUNEKE.
CUSPIDOR.
APPLICATION FILED DEC. 31, 1915.

1,199,793.

Patented Oct. 3, 1916.

Inventor,
F. H. Huneke
Frank N. Allen
By Fred'k K. Daggett.
Attorneys.

UNITED STATES PATENT OFFICE.

FRED H. HUNEKE, OF DAVIS, SOUTH DAKOTA.

CUSPIDOR.

1,199,793.      Specification of Letters Patent.      Patented Oct. 3, 1916.

Application filed December 31, 1915. Serial No. 69,545.

*To all whom it may concern:*

Be it known that I, FRED H. HUNEKE, a citizen of the United States, residing at Davis, in Turner county, State of South Dakota, have invented a certain new and useful Improvement in Cuspidors, of which the following is a specification, reference being had to the accompanying drawings.

The object of this invention is to provide a reasonably cheap and specially convenient cuspidor, of the normally closed cover type, in which provision is made for temporarily raising said cover, by hand or by foot, whenever it is desired to expectorate into the cuspidor.

With these objects in view I have produced the cuspidor illustrated in the annexed drawings in which—

Figure 1:
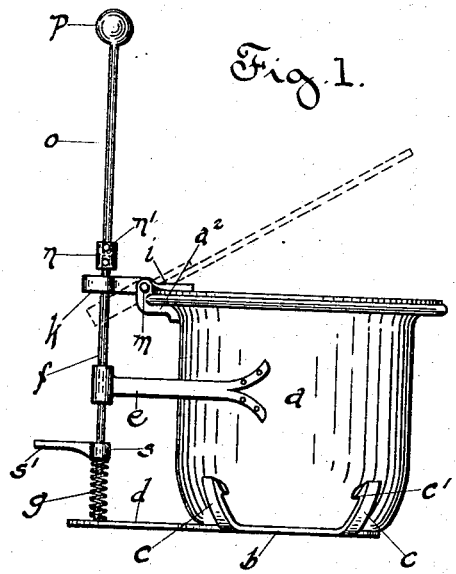
Figure 2:
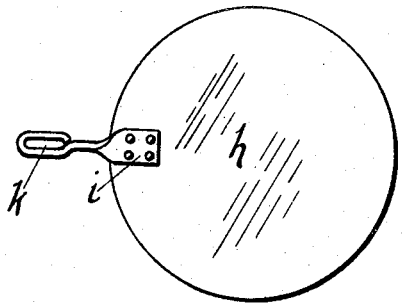
Figure 3:
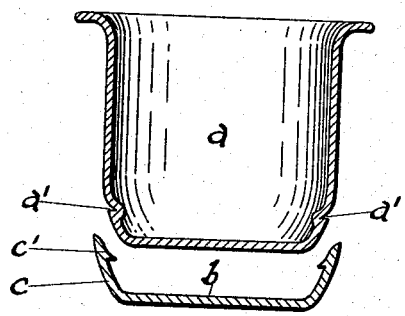

Figure 1 is a side elevation of a cuspidor embodying my present improvements and Fig. 2 is a plan view of the cover. Fig. 3 is a vertical, sectional, view of the cuspidor bowl and of the base $b$ showing particularly the means provided for removably connecting the bowl to said base.

Referring to the drawings the letter $a$ indicates the cuspidor bowl, made of metal or other suitable material, said bowl being removably seated on a base $b$, between upturned spring fingers $c$, as here illustrated, and so that the bowl may be readily removed for the purpose of cleaning it. The base $b$ is extended laterally as at $d$. Secured to the bowl at a point about midway of the height of said bowl is a laterally extending bracket $e$ which is forked vertically to receive a rod $f$, the lower end of said rod being supported on a spring $g$ whose lower end rests on the base extension $d$; the arrangement of the rod and spring being such that the spring acts to hold the rod normally in its raised position.

The free end portions of the spring fingers $c$ are formed as hooks $c'$ which are adapted to engage, and interlock with, depressions or indentations $a'$ in the bowl $a$, as will be understood by reference to Fig. 3 of the drawings which represents the bowl and fingers separated.

The cover of the bowl is indicated by the letter $h$ and said cover is hinged in any practical way to the bowl. As here shown the cover has secured thereto a laterally extending plate $i$ which is formed into an eye $k$ by means of which the cover may be hinged to the bowl by a pin $m$ which passes through said eye and through an opening in a bracket $a^2$ secured to the bowl. The plate $i$ is twisted, as seen, and the free end portion is bent to form an eye through which the rod $f$ passes and just above said last named eye is a collar $n$ which is secured to the said rod by a set screw $n'$ and serves as an abutment for the plate $i$, as well as a coupling for a rod $o$ which extends upward a considerable distance and terminates in a ball-shaped handle $p$.

Secured to the rod $f$, near its lower end, is a collar $s$ having a laterally extending plate $s'$ of suitable size and shape to receive one's foot and, by means of which, the said rod may be forced downward against the expansive force of the spring $g$ or, the handle $p$ may be grasped and the rod may thus be forced down manually. In either instance the coupling collar $n$ will force the plate $i$ downward and will thus rock the cover $h$ to open it (see Fig. 1 in dotted lines). As soon as the cuspidor has been used as such, the pressure of the hand or foot, as the case may be, is removed, when the spring $g$ immediately forces the rod upward to its normal position and thus permits the cover of the cuspidor to close by reason of its own weight.

My described device may be produced at a reasonable cost; it may be of pleasing design, of polished or plated material, if desired, and it may be conveniently operated by the user of said device.

Having thus described my invention I claim as new and wish to secure by Letters Patent:—

A cuspidor including a base plate, a bowl, means for removably latching the bowl on said plate, a hinged cover for the bowl provided with a lateral extension adjacent the point of hinging, a lateral bracket secured on the bowl and terminating in a bearing, a vertically movable rod yieldingly supported at its lower end on said base and guided through said bearing, a collar removably secured to the rod and adapted to contact with the extension on said cover when the rod is lowered and means for operating said rod by hand and foot power.

FRED H. HUNEKE.